United States Patent [19]

Montgomery et al.

[11] Patent Number: 5,203,070
[45] Date of Patent: Apr. 20, 1993

[54] METHOD OF MANUFACTURING A MODULAR ELECTRICAL GENERATOR

[75] Inventors: Lon W. Montgomery, Winter Springs; Glenn D. Cooper, Orlando; William R. McCown, Winter Springs, all of Fla.

[73] Assignee: Westinghouse Electric Corp., Pittsburgh, Pa.

[21] Appl. No.: 867,994

[22] Filed: Apr. 13, 1992

[51] Int. Cl.⁵ .......................................... H02K 15/14
[52] U.S. Cl. ........................................ 29/596; 310/42
[58] Field of Search .................. 29/596, 598; 310/42, 310/216, 254, 261, 258, 259, 262, 273

[56] References Cited

U.S. PATENT DOCUMENTS

| | | | |
|---|---|---|---|
| 3,802,066 | 4/1974 | Barrett | 29/596 |
| 4,096,624 | 6/1978 | Gray et al. | 29/596 |
| 4,204,313 | 5/1980 | Khutoretsky et al. | 29/596 |
| 4,205,429 | 6/1980 | Fooyontphanich et al. | 29/596 |
| 4,506,180 | 3/1985 | Shizuka et al. | 29/596 X |

Primary Examiner—Timothy V. Eley

[57] ABSTRACT

A method of designing and manufacturing an electrical generator which has a specific target power output rating includes the steps of selecting one of a predetermined, standardized set of diameters for the rotor, stator and frame of the generator; and subsequently selecting the length of the generator stator core and one of several standardized number of stator coil slots based on the target power rating and voltage of the generator. The invention permits standardized generator components which are specific to the selected set of diameters to be used during assembly of the generator, instead of customized components, which results in reduced design and manufacturing costs per generator.

20 Claims, 6 Drawing Sheets

METHOD OF MANUFACTURING A MODULAR ELECTRICAL GENERATOR

BACKGROUND OF THE INVENTION

1. Field of the Invention

This invention relates to the design and manufacture of electrical generation equipment. More specifically, this invention relates to an improved method for designing and manufacturing electrical generators which is less labor-intensive than traditional methods and which promotes standardization of design among different generator models.

2. Description of the Prior Art

Traditionally, designing an electrical generator which is intended for a specific application and a predetermined set of power generation requirements has been an expensive, time consuming process. In the traditional design process, the electrical aspects of the generator would, as a first step, be engineered depending on the specific power generation characteristics that are required. A second phase of the traditional design process is to engineer the mechanical aspects of the generator, which, of course, are optimized to meet the requirements of the electrical design. The third phase of the traditional design process would be to engineer the optimal process for manufacturing a generator having the specified electrical and mechanical designs. The traditional process of designing electrical generators has been effective from a qualitative standpoint, but is becoming increasingly impractical on a per generator cost basis.

Specifically, many of the components in a generator designed and manufactured according to the traditional process were customized for use with that particular generator design, and were not compatible for use with other types of generators. Such components include those forming the outer frame work of the generator, the rotor bearings and associated brackets, the stator end windings, other accessors components associated with both the stator winding and the rotor, and the lead box and associated structure which is used to conduct the generated electricity from the stator to a source location where it can be distributed. The expense of designing such customized components for each type of generator and the cost of tooling to manufacture those components materially contributes to the cost of the generators.

It is clear that there has existed a long and unfilled need in the prior art for a method of designing and manufacturing electrical generators which reduces design and manufacturing costs, preserves flexibility of application and which can be used to design and manufacture generators of proven reliability for commercial power generation requirements.

SUMMARY OF THE INVENTION

Accordingly, it is a first object of this invention to provide a method for designing and manufacturing electrical generators which is less costly on a per generator basis than the traditional design and manufacturing process is.

It is a second object of the invention to provide an improved method for designing and manufacturing electrical generators which optimizes design flexibility, permitting the design and manufacture of electrical generators suitable for a broad range of power generation requirements.

It is a third object of the invention to provide an improved method for designing and manufacturing electrical generators which can be used to produce electrical generators of proven reliability, which will be attractive for use in both industrial and commercial power generation applications.

In order to achieve the above and other objects of the invention, a method of designing an electrical generator having an intended power output rating which uses as many standardized, modular components as possible, includes, according to a first aspect of the invention, the steps of (a) selecting a standardized set of diameters for the rotor and stator of the generator; and (b) selecting the length of the stator core based on the specific intended power rating of the generator, whereby standardized generator components which are specific to the selected set of diameters may be used during assembly of the generator instead of customized components, such standardization resulting in reduced design and manufacturing costs per generator.

A method of making an electrical generator having an intended power output rating which uses as many standardized, modular components as possible, includes, according to a second aspect of the invention, the steps of (a) selecting a standardized set of diameters for the rotor and stator of the generator; (b) selecting the length of the stator core based on the specific intended power rating of the generator; and (c) manufacturing a generator having the selected set of diameters and stator core length by using standardized generator components which are specific to the selected set of diameters instead of by using customized components, whereby design and manufacturing costs per generator are reduced.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
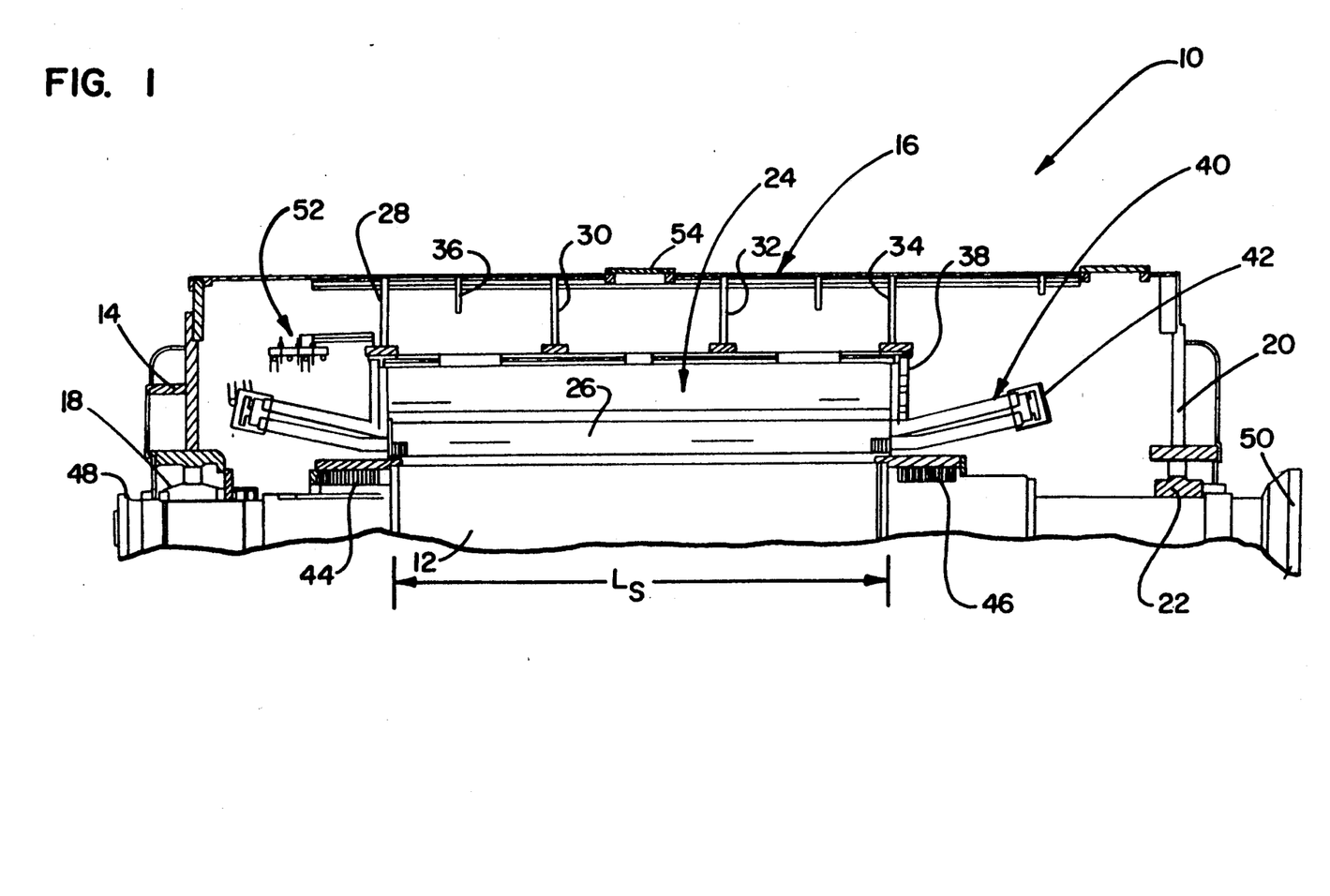
FIG. 1 is a fragmentary cross-sectional view of a modular electrical generator designed and manufactured according to the invention.

Referring now to the drawings, wherein like reference numerals designate corresponding structure throughout the views, and referring in particular to FIG. 1, a modular electrical generator 10 according to a preferred embodiment of the invention includes a rotor 12 which is mounted to rotate with respect to a bearing bracket 14 in a generator frame 16 by a journal bearing 18, and with respect to a bearing bracket 20 of the frame 16 by a journal bearing 22. The rotor 12, which is of conventional design in as much as its windings and other details of construction are concerned, is thus mounted to rotate within and closely spaced from a stator core 24 having a plurality of slots 26 defined therein. Slots 26 contain the stator windings, which are of known construction, and are connected at their involute portions 40 by end connectors 42, as may be seen in FIG. 1. The stator core 24 is fixedly positioned within the frame 16 by a number of radially inwardly extending frame ring portions 28, 30, 32, 34 of the generator outer frame 16, as may further be seen in FIG. 1. Stator core 24 includes a pair of end plates 38, which are of aluminum construction to minimize flux loss in the stator core and which are joined together by through bolts to clamp the stator core together, in a manner which is common in electrical generator designs. Rotor 12 includes end windings 44, 46, both of which are head in place by respectively retaining rings, and a central shaft which is supported by the respective journal bearings 18, 22. One end of rotor 12, which terminates at the end thereof supported by journal bearing 18, forms an exciter end coupling 48. An opposite end of rotor 12 terminates in a rotor turbine drive end coupling 50. In operation, exciter end coupling 48 forms a connection for a DC current, which is applied to the windings of rotor 12 to create an electromagnetic field about the rotor 12. The rotor turbine drive end coupling 50 is attached to a turbine or other source of mechanical energy to turn the rotor 12 with respect to the stator core 24. According to known principles, rotation of the rotor 12 and its associated electromagnetic field induces an electrical voltage in the stator windings embedded in slots 26 in the stator core 24, thus driving a current within the stator windings. This current is collected and channeled to a set of parallel rings 52, which in turn connect to a lead box 56, shown in FIGS. 3A and 3B. The lead box 56 includes 3 pairs of high voltage bushings 58, each pair of which is dedicated to one phase of the generated electricity. In the preferred embodiment, modular electrical generator 10 is a three phase generator. It should be understood, however that the principles of this invention could equally apply to species of generators which are constructed to generate other than three phase type power.

Figure 2:
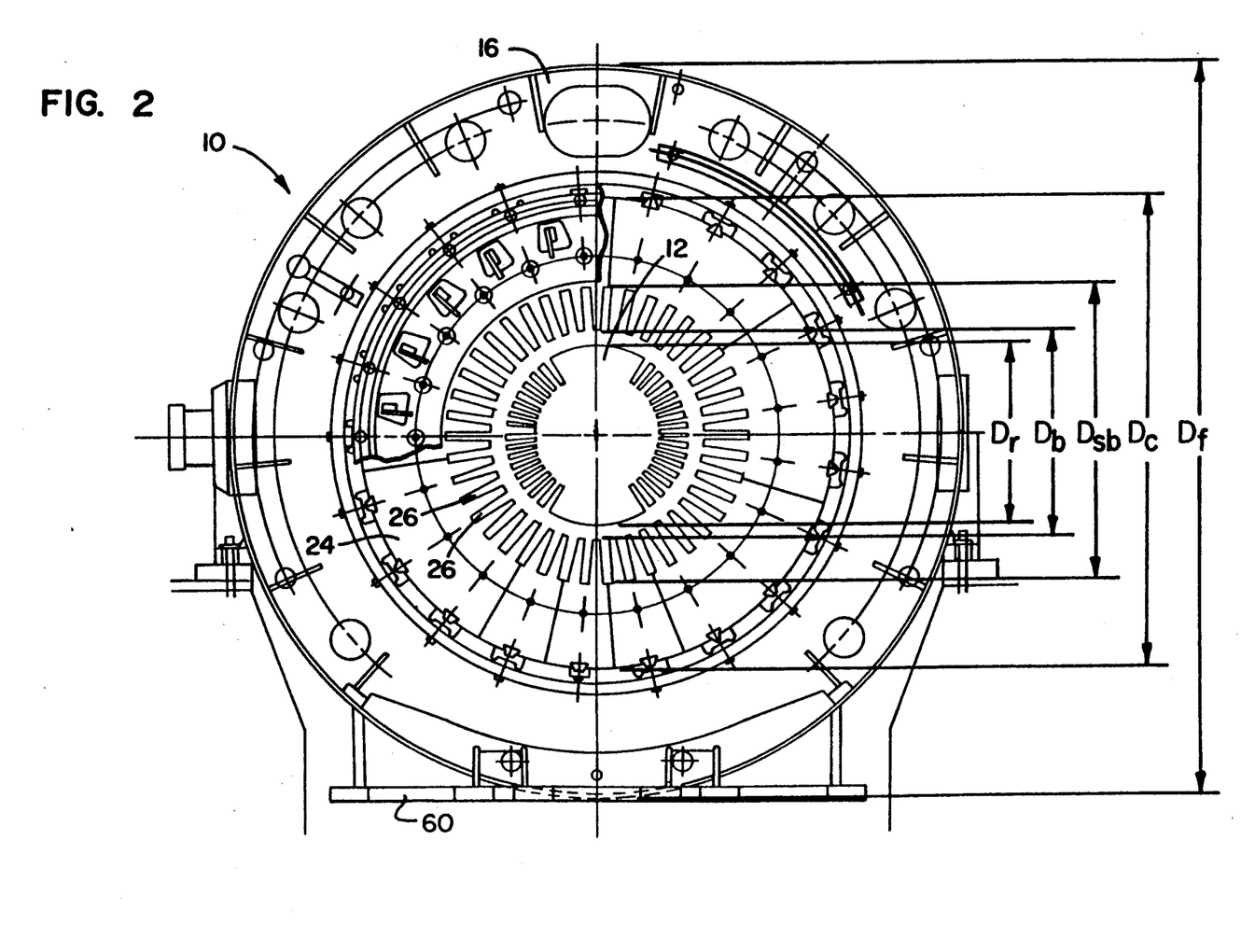
FIG. 2 is the diagrammatical cross-sectional view of a generator designed and manufactured according to the invention, depicting a standardized diameter set according to one aspect of the invention.

The present inventors have discovered, that for design and manufacturing purposes, it is much less costly to adjust the length of a given cross section of the active volume in an electrical generator design than it is to change any of the diameters of that cross section. By designing and manufacturing generators having different power generation capacities but the same cross-sectional diameter, a high degree of standardization can be achieved with respect to parts and accessory components. Therefore, the inventors have developed a method of designing and manufacturing an adjustable, modular line of electrical generators which is based on a regularly spaced grid of diameters and lengths. In the preferred embodiment of the invention, the inventors have developed three distinctive diameter sets to be used for designing a generator having a customized set of power requirements. According to the preferred embodiment of the invention, each diameter set includes, as is diagrammatically depicted in FIG. 2, a diameter $D_r$ referring to the outer diameter of the rotor 12, a diameter $D_b$ referring to the inner diameter of the stator core 24, a diameter $D_{sb}$, which represents the outer diameter to the bottom of the slots 26 in the generator core 24, a diameter $D_c$, which represents the outer diameter of the stator core 24, and a diameter $D_f$, which represents the outer dimension of the generator outer frame 16.

Of the listed dimensions, the most critical from the standpoint of designing the electrical generation capacity of the generator are the diameters $D_r$, $D_b$, and the diameter $D_{sb}$. Specifically, covering an MVA range with a generator of a given style and power density requires varying true diameter and length of the active volume of the generator, the D times L cylinder which contains the rotor pole and stator core. End effects neglected, the power output of a generator is given by the formula $$P \alpha BALD^2n$$

where:
P = electrical power output
B = rotor flux density
A = armature current density
L = active length of rotor
D = diameter of rotor
n = rotational speed (electrical frequency 0.1 equal to rotational speed times the number of magnetic poles).

For a given stator winding pitch, the voltage of the generator is given by the formula:

$$V \alpha BLDNn$$

where:
V = terminal voltage
N = effective number of stator conductors in series (proportional to the number of stator slots; inversely proportional to the number of parallel circuits).

The short circuit ratio (SCR) of a generator, which is the reciprocal of saturated synchronous reactance, is roughly given by the formula:

$$SCR \alpha B^2g/AD.$$

It should be noted in the previous three equations that SCR is independent of length and speed, that terminal voltage is independent of armature current density, and that power output is independent of the number of stator slots. For directly cooled machines, where variable losses greatly exceed no-load losses at maximum capability, machine losses are roughly proportional to the square of the armature current density and nearly directly proportional to flux density. At very high levels of flux density, losses increase more rapidly than linearly because of the effect of saturation on field current and the need to increase stator teeth width to prevent the successive heating of the stator strands closest to the stator core which can be caused by radial flux heating.

Considering these relationships, it was possible to optimize design performance by selecting power density levels which provided adequate efficiency (98.5% minimum, bearings and seal included) while satisfying customer requirements for SCR (0.50 minimum). Gap size was selected based on electromagnetic, thermal, and mechanical considerations (ventilation and clearance for rotor insertion). Gap flux density levels and armature current density levels were selected to satisfy efficiency and minimum SCR levels. Voltages were calculated from flux densities and lengths for standard stator winding arrangements.

Figure 4:
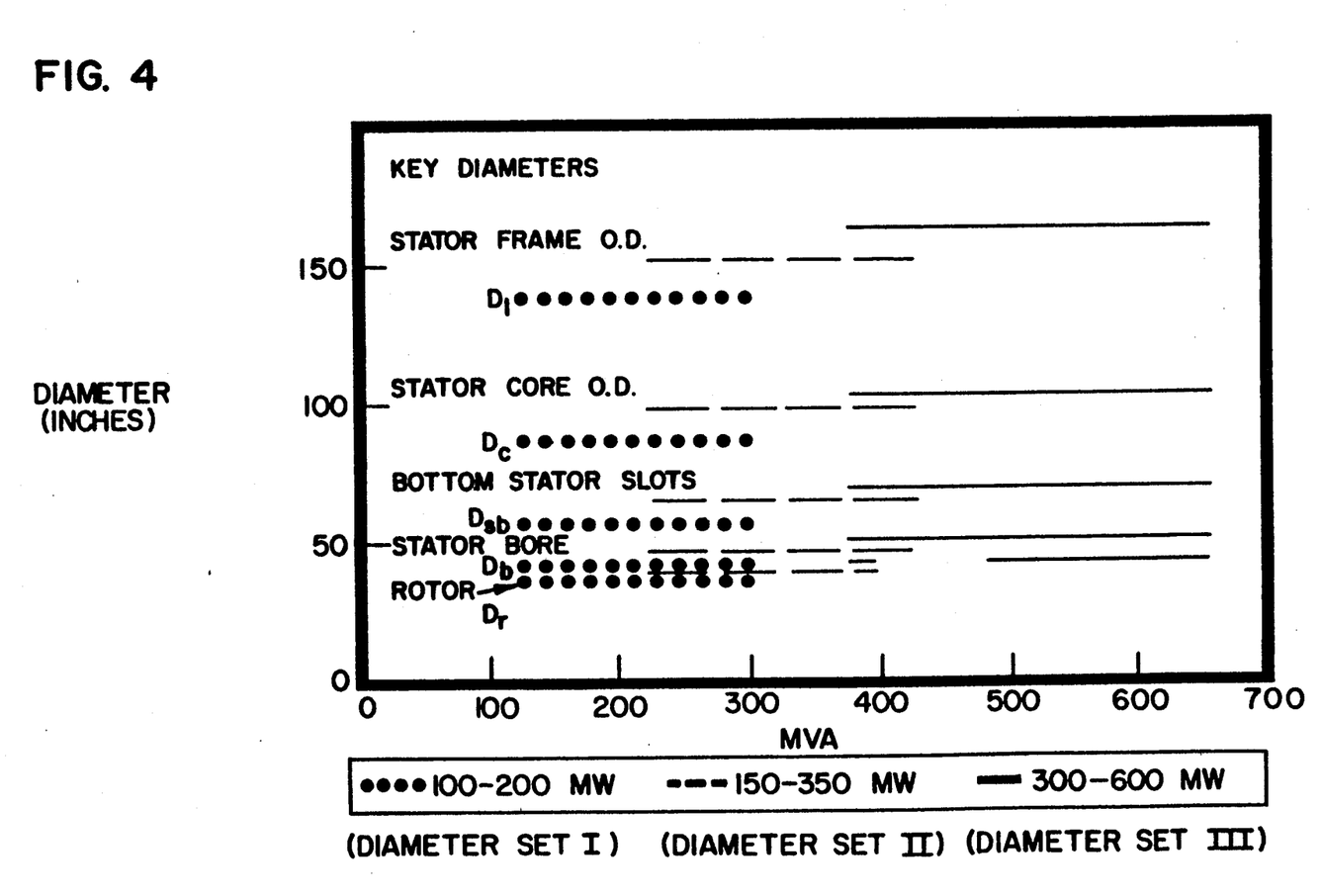
FIG. 4 is a graphical depiction of the preferred values for a first, a second and a third diameter set according to the invention, versus the potential power generation capacity for each diameter set.

With the above factors in mind, three preferred diameter sets for electrical generators have been developed for designing and manufacturing electrical generators having power outputs approximately within the range of 100–600 MW (110–680 MVA). Use of three different sets of preferred values for diameters $D_r$, $D_b$, $D_{sb}$, $D_c$, and $D_f$ to cover the entire power range of 110 to 680 MVA are illustrated in FIG. 4, which is a graphical depiction of the preferred values for the first, second, and third diameter sets versus potential power generator capacity.

Figure 3A:
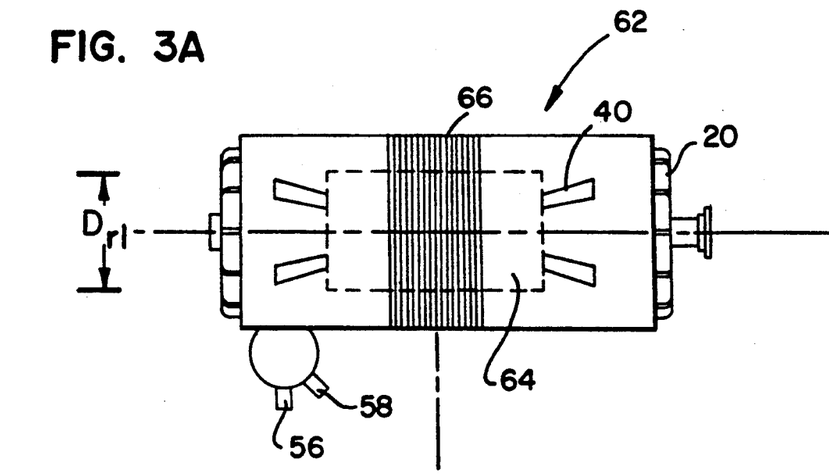
FIG. 3A is a diagrammatical view of a generator constructed according to the invention, having a first diameter set.
Figure 3B:
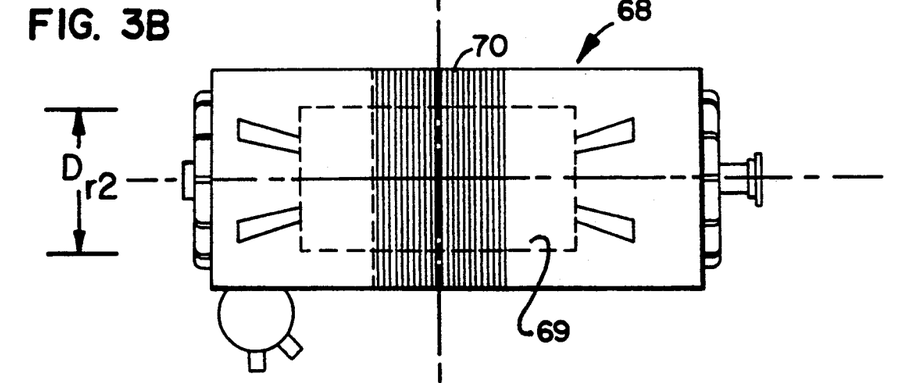
FIG. 3B is a diagrammatical view of a generator constructed according to the invention, having a second diameter set.
Figure 3C:
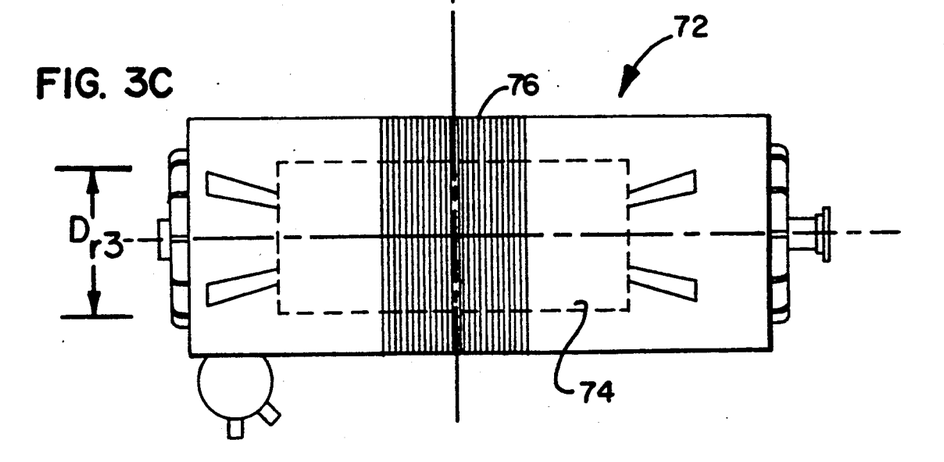
FIG. 3C is a diagrammatical view of a generator constructed according to the inventions, having a third diameter set.

A generator 62 constructed according to the first diameter set is diagrammatically depicted in FIG. 3A. Generator 62 includes a stator core 64 which can be varied in length depending upon the intended power generation capacity of the generator 62. An optional length portion 66 of stator core 64 is diagrammatically depicted in FIG. 3A. Similarly, FIGS. 3B and 3C depict generators 68, 72 which are constructed according to the second and third diameter sets, respectively. Generators 68, 72 include stator cores 69, 74, respectively, which include optional length portions 70, 76.

Figure 5:
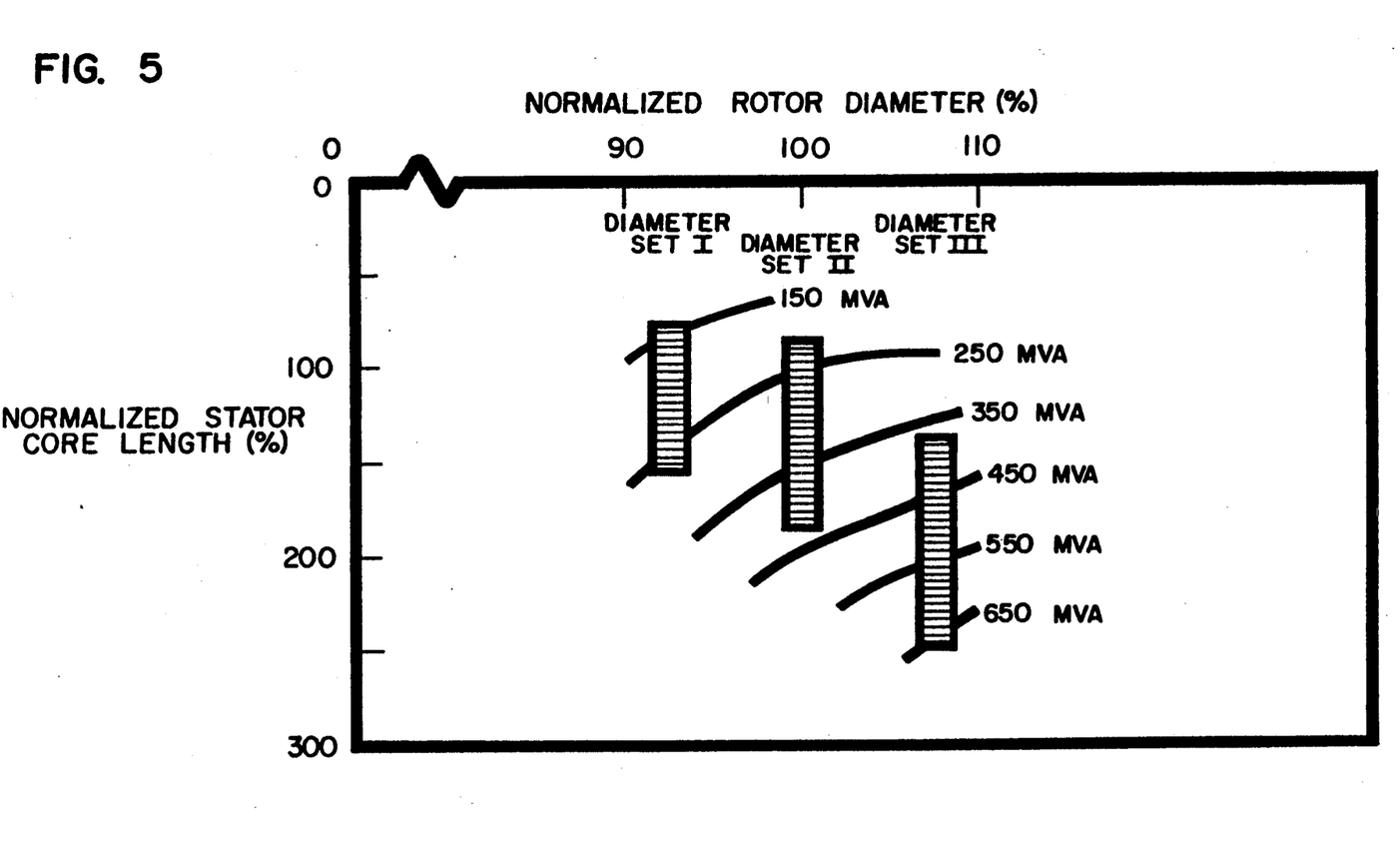
FIG. 5 is a graphical depiction of normalized rotor diameter versus normalized stator core length, showing the proportional relationship between stator core length and power generation capacity for generators constructed according to the respective diameter sets.
Figure 6:
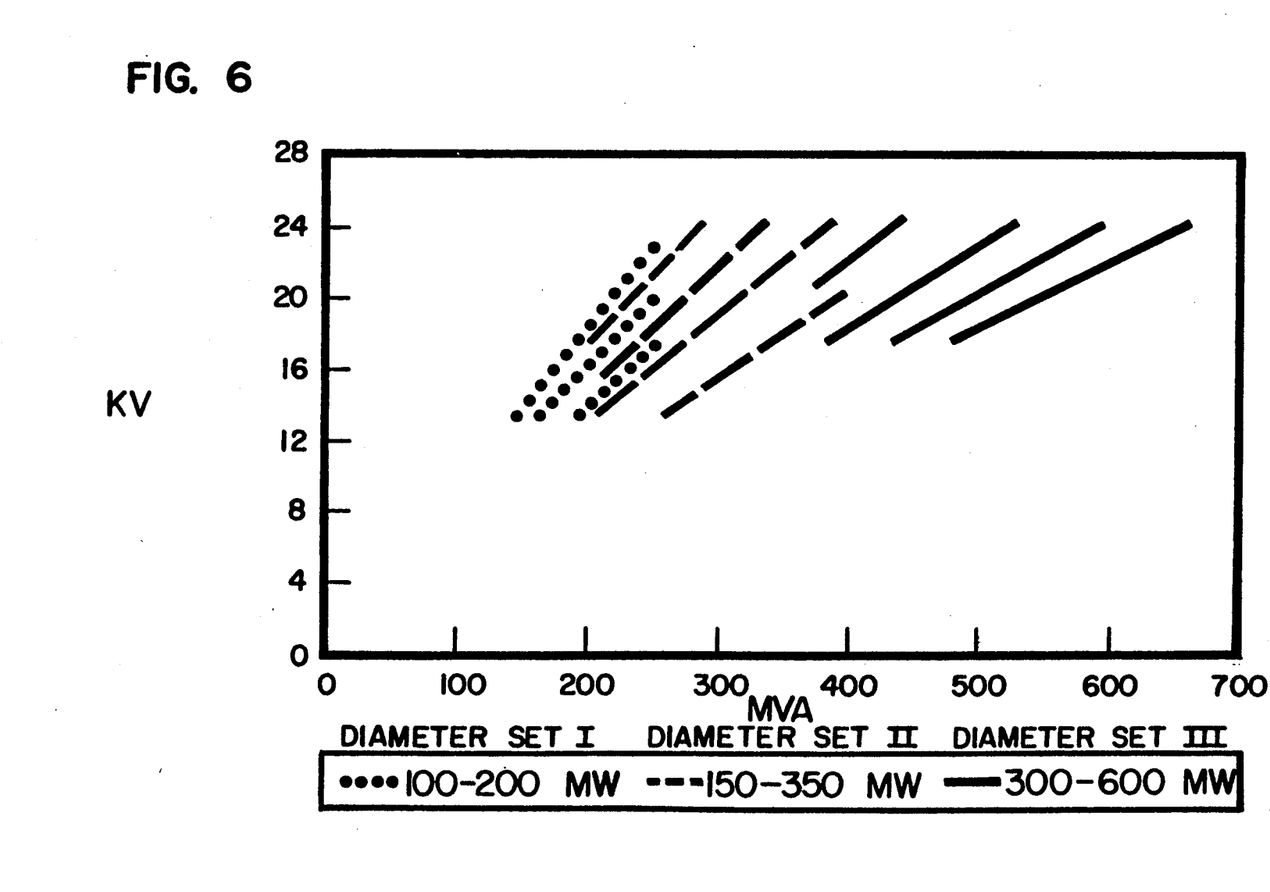
FIG. 6 is a graphical depicting of available voltage ranges as a function of MVA rating for each of the three diameter sets.

To design and manufacture an electrical generator having an output between 100–600 MW (110–680 MVA), one of diameter set I, diameter set II, or diameter set III is selected; and a length $L_s$ for the stator core 24 and one of several stator winding slot combinations are decided upon based upon the desired frequency, the desired power output, and the desired voltage. Choice of stator core length $L_s$ and the applicable diameter set is guided by tabulations of length and diameter, as indicated in FIG. 5; choice of varying voltage is guided by table of permitted stator slot combinations, as indicated by FIG. 6. In the most preferred embodiment of the invention, diameter set I may be selected to provide an MVA output within a range of approximately 110 MVA to 300 MVA, depending upon the desired frequency of the power input. To select a more specific MVA output within that range with diameter set I, the length $L_s$ of the stator core is selected from values in the length range of diameter set I, among discrete length increments, which in the preferred embodiment are approximately four inches apart, as illustrated in FIG. 5. Similarly, diameter set II may be selected to provide an MVA output of between approximately 200 MVA to 400 MVA. For diameter set II, the length $L_s$ is selected from values in the length range of diameter set II, as illustrated in FIG. 5, also in approximately 4 inch steps or increments. The specific length $L_s$ decided upon will again be an optimization of the desired MVA output of the generator, and the required peak voltage output. And, in the same fashion, diameter set III may be selected to provide an MVA output of between approximately 350 MVA to 680 MVA. For diameter set III, the length $L_s$ is selected from values in the length range of diameter set III, as illustrated in FIG. 5, also in approximately 4 inch steps or increments.

By limiting the deviation between specific generators within a diameter set to varying the stator core length $L_s$ and the number of stator slots, standardization is achieved for those components in the modular electrical generator 10 which are not dependent upon length $L_s$. In particular, these include the respective bearing brackets 14, 20 the journal bearings 18, 22, the end couplings 48, 50, the respective end connectors 42 for the stator windings, the rotor end windings 44, 46, the laminations constructing the stator core 24, frame rings, clamping rings, tooling required to manufacture, stator conductors, rotor conducting, and rotor slots and core assembly masses of the parallel ring structure 52. All of those components will be standardized according to the invention. Moreover, although the length of frame 16 must change with adjustments and stator core length $L_s$, certain components thereof, such as those dependant upon the outer diameter of frame 16, will stay the same, so a certain degree of standardization is achieved with respect to frame 16 as well.

It will be appreciated, then, that the modular generator design presented by the invention will maximize the use of standardized, modular components in generator design and manufacturing. This standardization and manufacturing will reduce both design and manufacturing costs, resulting in a reduced price per unit for the customer.

It is to be understood, however, that even though numerous characteristics and advantages of represent invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:
1. A method of designing an electrical generator having an intended power output rating which uses many standardized, modular components, comprising:
  (a) selecting a standardized set of diameters for each of the rotor and stator of the generator, said standardized set of diameters being used for the design of other generators having different power outputs than the generator being designed as well; and
  (b) selecting the length of the stator core based on the intended power rating of the generator, whereby standardized generator components which are specific to the selected set of diameters may be used during assembly of the generator instead of components which are unique to a generator having a specific power rating, such standardization resulting in reduced design and manufacturing costs per generator.

2. A method according to claim 1, wherein step (a) is performed by selecting between at least first and second standardized diameter sets based on whether the intended power rating is within a first power output range corresponding to the first diameter set or a second power output range corresponding to the second diameter set.

3. A method according to claim 1, wherein the standardized set of diameters in step (a) includes the outer diameter of the generator rotor.

4. A method according to claim 1, wherein the standardized set of diameters in step (a) includes the inner diameter of the stator core.

5. A method according to claim 1, wherein the standardized set of diameters in step (a) includes a diameter which defines a bottom of slots which are defined in the stator core.

6. A method according to claim 1, wherein the standardized set of diameters in step (a) includes the outer diameter of the stator core.

7. A method according to claim 1, wherein the standardized set of diameters in step (a) includes the outer diameter of the generator frame.

8. A method according to claim 1, further comprising the step of:
   (c) selecting a width and number of slots which are to be defined in the stator core based on the desired voltage output of the generator.

9. A method according to claim 8, wherein the selection performed in step (c) is further a function of the intended frequency output of the generator.

10. A method according to claim 1, wherein step (b) further comprises selecting the length of the stator core to obtain the desired voltage output.

11. A method of making an electrical generator having an intended power output rating which uses many standardized, modular components, comprising:
   (a) selecting a standardized set of diameters for each of the rotor and stator of the generator, said standardized set of diameters being used for the design of other generators having different power outputs than the generator being designed as well;
   (b) selecting the length of the stator core based on the intended power rating of the generator; and
   (c) manufacturing the generator having the selected set of diameters and stator core length by using standardized generator components which are specific to the selected set of diameters instead of components which are unique to a generator having a specific power rating, whereby design and manufacturing costs per generator are reduced.

12. A method according to claim 11, wherein step (a) is performed by selecting between at least first and second standardized diameter sets based on whether the intended power rating is within a first power output range corresponding to the first diameter set or a second power output range corresponding to the second diameter set.

13. A method according to claim 11, wherein the standardized set of diameters in step (a) includes the outer diameter of the generator rotor.

14. A method according to claim 11, wherein the standardized set of diameters in step (a) includes the inner diameter of the stator core.

15. A method according to claim 11, wherein the standardized set of diameters in step (a) includes a diameter which defines a bottom of slots in the stator core.

16. A method according to claim 11, wherein the standardized set of diameters in step (a) includes the outer diameter of the stator core.

17. A method according to claim 11, wherein the standardized set of diameters in step (a) includes the outer diameter of the generator frame.

18. A method according to claim 11, further comprising the step of:
   (b) (i) selecting the width and number of the slots which are to be defined in the stator core based on the desired voltage output of the generator prior to step (c), and wherein step (c) further comprises manufacturing the generator according to a selected width and number of slots.

19. A method according to claim 18, wherein the selection preformed in step (b)(i) is further a function of the intended frequency output of the generator.

20. A method according to claim 11, wherein step (b) (b) further comprises selecting the length of the stator core to obtain the voltage output.

* * * * *